United States Patent Office 3,520,193
Patented July 14, 1970

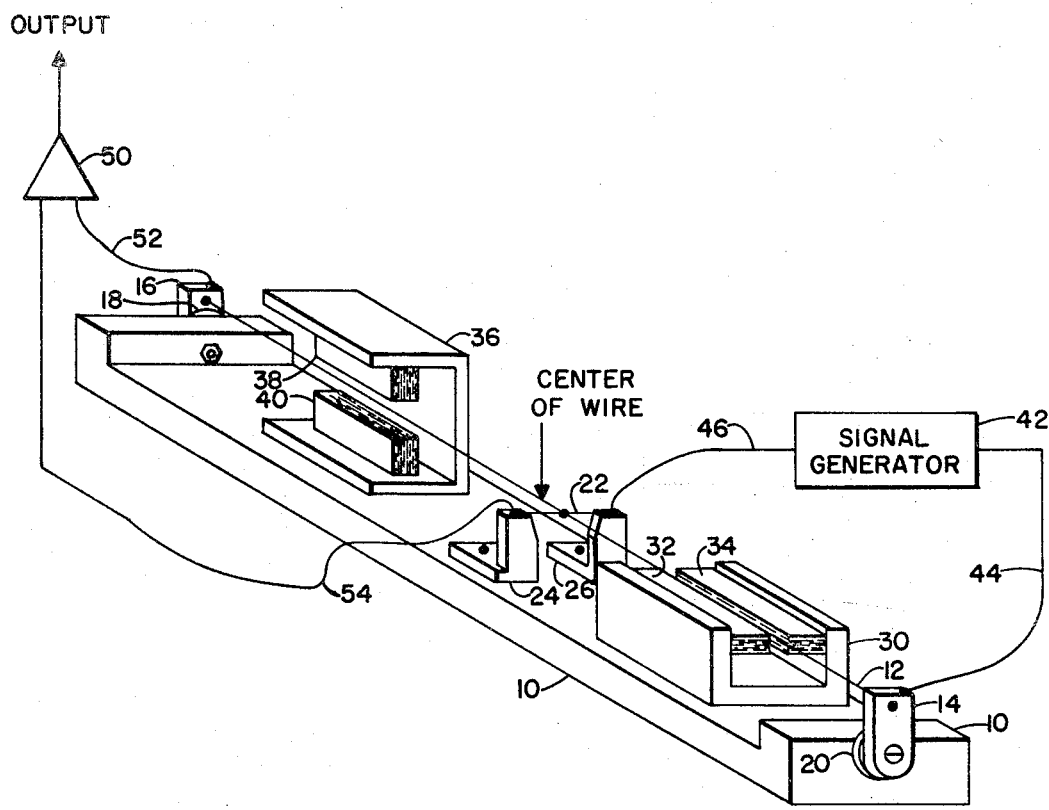

3,520,193
VIBRATING WIRE GYROSCOPE
Robert H. Grangroth, Minneapolis, Minn., assignor to Honeywell Inc., Minneapolis, Minn., a corporation of Delaware
Filed Aug. 29, 1966, Ser. No. 575,723
Int. Cl. G01p *15/00*
U.S. Cl. 73—505                4 Claims

ABSTRACT OF THE DISCLOSURE

A vibrating wire gyroscope in which a flexible electrical connection near the center of the wire serves to permit vibration to pass from one portion of the wire to the other while electrically isolating the drive signal in the first portion from the output signal in the other portion and suppressing unwanted transverse vibrations.

---

The present invention relates to angular rate sensors and more particularly to the improvement of a vibrating wire type of angular rate sensor such as is shown in copending application Ser. No. 567,760 in the name of Daniel G. Taylor also assigned to the present assignee.

Briefly, the prior art device as shown in the above copending application comprises a support member upon which is stretched a taut wire. The wire is further mounted by a flexible or pivoting mount near the center so as to divide the wire into two dynamically coupled portions. Magnetic forces are used to vibrate one portion of the wire in a planar mode. This vibration passes over the center support so that the second portion of the wire vibrates also. By placing the second portion in a magnetic field, its movement or vibration produces a current flow in the second portion which may be measured as an indication of the wire's orientation. The vibrating wire will tend to continue to vibrate in a single inertial plane. This basic phenomena is the result of the same inertial forces which tend to stabilize a spinning wheel. Thus, if the support member is rotated about an axis which is generally parallel and along the wire, the vibrating wire will resist the rotation and the relative change in position of the wire may be monitored and the rotational rate measured.

One undesirable side effect of the aforementioned device arises from the vibration characteristics of the wire. Despite the fact that the driving magnetic forces operate to vibrate the wire in a predetermined plane, a transverse vibration orthogonal to the desired vibration will develop so that the resultant vibration of the wire is elliptical in nature, thus, decreasing the accuracy of the device. The present invention contemplates an improvement in the design so as to suppress these unwanted transverse vibrations. Instead of positioning the flexible or pivoting mount at the center of the wire as disclosed in the above-referenced copending application the center support is positioned at a point sufficiently far off center so as to detune the wire with respect to its natural vibrations. Although it would seem at first that this would destroy all vibrations in the wire it has been found that a slight displacement of the center mount will not seriously hinder vibrations in the predetermined plane which are caused by magnetic forces but will eliminate the undesirable transverse vibrations.

Accordingly, it is an object of the present invention to provide improved control apparatus.

It is a further object of my invention to provide a vibrating wire type of angular rate sensor in which undesirable vibrations are tuned out so that only the predetermined vibration can exist.

Further objects and advantages will become evident with reference to the accompanying detailed description and drawing in which a perspective view of a preferred embodiment of my invention is schematically shown.

In the drawing, a support member 10 is shown upon which is mounted a taut wire 12. Wire 12 is fastened to a pair of metal tabs 14 and 16 which are mounted to support member 10. A pair of small washers 18 and 20 serve to insulate tabs 14 and 16 from support member 10. Wire 12 is further mounted by means of a small yoke wire 22, which is in turn supported by a pair of yoke tabs 24 and 26. Tabs 24 and 26 are affixed to support member 10. Yoke wire 22 serves to limit the displacement of wire 12 in any direction and permit electrical connections to wire 12. However, yoke wire 22 will twist on its axis so as to provide a resilient or flexible mount for wire 12. Thus, a nodal point is created near the center of wire 12, and any vibrations in one portion of the wire will generate identical but opposite phased fluctuations in the other portion of the wire. That is to say, wave motion in wire 12 may travel across the flexible nodal mounting at yoke wire 22.

In the prior art device described in the above-referenced copending application yoke wire 22 was mounted at the center of wire 12. In this way a node was provided at the proper location so that the wire could be driven at its natural resonant frequency as is well known to those skilled in the art. However, in the present invention the yoke wire is shown displaced slightly toward tab 14 and the effect of this will be more fully discussed below.

Wire 12 is driven by a pair of magnets 32 and 34 which are supported on each side of wire 12 by means of a mounting bracket 30. The lines of force from magnets 32 and 34 are substantially perpendicular to wire 12. In a like manner, a bracket 36 positions a pair of magnets 38 and 40 so as to produce a magnetic field whose lines of force are perpendicular to the second portion of the wire and also orthogonal to the lines of force of the magnets 32 and 34. A signal generator 42 causes an alternating current to flow in the first portion of wire 12 between magnets 32 and 34. Suitable electrical connections are made by means of leads 44 and 46. Signal generator 42 provides an alternating drive current at the same frequency as the natural resonant frequency of the wire. The flow of current along the wire through the horizontal perpendicular magnetic field from magnets 32 and 34 will cause the first portion of wire 12 to vibrate or oscillate in a vertical plane. These vibrations will be transmitted across the flexible yoke wire 22 into the second portion of wire 12 so that the second portion of wire 12 will also oscillate in a vertical plane. Since the magnetic field from magnets 38 and 40 is in a vertical direction, the oscillations of wire do not cross or break any of the lines of force. Consequently, as is well known to those skilled in the art, no current is generated in the second portion of wire 12. An amplifier 50 is connected to this portion or wire 12 by means of leads 52 and 54. If support member 10 is rotated about an axis generally along the wire 12, bracket 36, and magnets 38 and 40 will rotate with support member 10. However, due to the inertial qualities of wire 12, it will attempt to continue to oscillate the same vertical plane as before. Thus, wire 12 will start cutting the magnetic lines of force from magnets 38 and 40 and an oscillating signal will be presented to amplifier 50 whose output is proportional to the inclination of the vibration plane with respect to the lines of force from magnets 38 and 40. The phase of the signal presented to amplifier 50 will be representative of the direction of rotation. A more detailed analysis of the operation to this point may be had by reference to the aforementioned copending application.

As mentioned earlier if yoke wire 22 is mounted at the center of wire 12 as disclosed by the above-referenced copending application wire 12 will not only oscillate in the plane in which it is driven but also in various other transverse modes so that the output signal presented to amplifier 50 will not have the best signal to noise ratio. However, if, as in the present invention, the yoke wire 22 is displaced slightly to either side of the center of wire 12 the only vibration that can be sustained in wire 12 will be that which is forced by the drive means, namely, signal generator 42. The amount of displacement of yoke wire 22 from the center is dependent upon the physical characteristics of wire 12. For example, I have discovered that if the wire is constructed from tungsten and its overall length is approximately 2 inches and the wire is stressed to approximately 150,000 pounds per square inch, the most desirable displacement is between 4 and 6 percent of the total length of the wire. However, these figures are not intended to limit the invention in any way since the amount of displacement may vary widely depending upon the physical dimensions of the apparatus.

It should be understood that many variations may be made to my invention without departing from the novel concept disclosed. For example, the preferred embodiment demonstrates moving yoke wire 22 to one side so as to detune wire 12 by making one portion shorter and the other portion longer. However, it is also possible to use two yoke wires, one on each side of the center or wire 12 so as to shorten both portions of the wire thus detuning them with respect to unwanted vibrations. In addition the two portions may be of different weights so as to cause detuning. It is evident, therefore, that many constructional variations are possible and I do not intend to limit the invention to the embodiments shown except as defined in the appended claims.

I claim:

1. Apparatus of the class described comprising:
   a straight wire adapted for vibration in a plane;
   electrically conductive means restraining said wire at three locations so as to establish nodal points at said three locations, the three nodal points dividing the wire into first and second unequal mechanically coupled and electrically independent portions;
   means for vibrating the first portion in a predetermined plane;
   means for generating a magnetic field through the second portion in a direction such that the wire vibrates along the lines of force of the magnetic field in said predetermined plane when the apparatus is stationary; and
   output sensing means connected to said second portion and adapted to measure any current flow therein.

2. The apparatus of claim 1 in which said first and second portions are unequal in length by an amount such that the natural frequency of vibration of the wire is tuned out.

3. An angular rate sensor comprising in combination:
   support means having an axis of rotation;
   an electrically conducting wire supported at both ends by said support means, generally along said axis of rotation, under tension, and also flexibly mounted near the center so that the wire has first and second dynamically coupled portions which portions have different vibrational characteristics;
   first generating means affixed to said support means for generating a first magnetic field with lines of force which are substantially perpendicular to said first portion;
   second generating means affixed to said support means for generating a second magnetic field with lines of force which are substantially perpendicular to said second portion and also orthogonal to the lines of force of said first magnetic field;
   current producing means for causing alternating current to flow in said first portion; and
   means connected to said second portion responsive to current flowing therein, which current is indicative in magnitude of the rotational rate of said support about said axis of rotation and indicative in phase of the direction of rotation.

4. The apparatus of claim 3 in which said first and second portions are different in length by an amount such that the natural frequency of vibration of said first portion is slightly different from the natural frequency of vibration of said second portion.

References Cited

UNITED STATES PATENTS

| 2,546,158 | 3/1951 | Johnson | 73—505 |
| 2,974,530 | 3/1961 | Jaoven | 73—505 |
| 3,316,768 | 5/1967 | Cook | 73—505 |

FOREIGN PATENTS

| 1,434,247 | 2/1966 | France. |

JAMES J. GILL, Primary Examiner

H. GOLDSTEIN, Assistant Examiner